United States Patent

Puvvada

(10) Patent No.: US 10,594,584 B2
(45) Date of Patent: *Mar. 17, 2020

(54) NETWORK ANALYSIS AND MONITORING TOOL

(71) Applicant: AppDynamics LLC, San Francisco, CA (US)

(72) Inventor: Suraj Puvvada, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/443,604

(22) Filed: Feb. 27, 2017

(65) Prior Publication Data

US 2017/0171092 A1     Jun. 15, 2017

Related U.S. Application Data

(63) Continuation of application No. 14/247,742, filed on Apr. 8, 2014, now Pat. No. 9,621,448.

(51) Int. Cl.

| H04L 12/26 | (2006.01) |
| H04L 12/24 | (2006.01) |
| H04L 12/841 | (2013.01) |
| H04W 24/08 | (2009.01) |

(52) U.S. Cl.
CPC ............ *H04L 43/10* (2013.01); *H04L 41/14* (2013.01); *H04L 43/0847* (2013.01); *H04L 47/286* (2013.01); *H04L 43/106* (2013.01); *H04W 24/08* (2013.01)

(58) Field of Classification Search
CPC .. H04L 43/50; H04L 43/0847; H04L 43/0852; H04L 41/14; H04L 47/286; H04L 43/106
See application file for complete search history.

(56) References Cited

U.S. PATENT DOCUMENTS

| 2005/0021999 A1* | 1/2005 | Touitou ............... H04L 63/1458 726/11 |
| 2005/0041582 A1* | 2/2005 | Hancock ................. H04L 43/00 370/231 |
| 2007/0076605 A1* | 4/2007 | Cidon ................. H04L 43/0847 370/230 |
| 2010/0061253 A1* | 3/2010 | Kaminsky ............... H04L 41/12 370/248 |
| 2012/0167083 A1* | 6/2012 | Suit ..................... G06F 11/0712 718/1 |
| 2014/0043992 A1* | 2/2014 | Le Pallec ................ H04L 43/10 370/252 |

(Continued)

*Primary Examiner* — Un C Cho
*Assistant Examiner* — Peter K Mak
(74) *Attorney, Agent, or Firm* — Behmke Innovation Group LLC; James Behmke; Stephen D. LeBarron

(57) ABSTRACT

A transmitted transport communication protocol (TCP) packet in an established TCP connection is intercepted and resent with a modified IP layer to determine network nodes within a network path. No new connection is required, and the data may be transmitted to its intended location as part of the existing connection, bypassing firewalls and other obstacles commonly affecting ping commands. The change to the IP layer may include a modified TTL value. Address location and response time may be determined for each node in a network path.

19 Claims, 8 Drawing Sheets

(56) References Cited

U.S. PATENT DOCUMENTS

2015/0163144 A1* 6/2015 Koponen .............. H04L 47/125
　　　　　　　　　　　　　　　　　　　　　　370/237
2015/0271084 A1* 9/2015 Nakakes ............... H04L 47/286
　　　　　　　　　　　　　　　　　　　　　　370/392

* cited by examiner

NETWORK ANALYSIS AND MONITORING TOOL

This application is a continuation of U.S. patent application Ser. No. 14/247,742, titled "Network Analysis and Monitoring Tool," filed, Apr. 8, 2014, the disclosure of which is incorporated herein by reference.

BACKGROUND OF THE INVENTION

As web based services have become more commonplace, accessing those services using portable wireless devices has increased as well. Users have access to smart mobile devices with wireless communication capabilities which provide more freedom to access web based services. More and more users are using devices over wireless networks to access web based services.

To ensure they provide quality network services, many companies monitor the performance of their network services. Though it is not difficult to monitor the machines themselves, it is difficult if not impossible for a company to determine the performance of a wireless network used to access their service. Previous solutions, such as for example trace route diagnostic tools, operate to send ping commands over a network to determine nodes along a network path. These nodes often do not process ping commands, however, based on firewall and other barriers, rendering trace route functionality useless in many systems.

What is needed is an improved method to monitor and analyze a network path associated with a web based service.

SUMMARY OF THE CLAIMED INVENTION

A transmitted transport communication protocol (TCP) packet in an established TCP connection is intercepted and resent with a modified IP layer to determine network nodes within a network path. No new connection is required, and the data may be transmitted to its intended location as part of the existing connection, bypassing firewalls and other obstacles commonly affecting ping commands. The change to the IP layer may include a modified TTL value. Address location and response time may be determined for each node in a network path.

An embodiment may include a method for monitoring a business transaction. A portion of a previously sent data packet for an established network connection may be modified. The modification may affect the life of the packet and may be made by an agent executing on a computing device which sends the packet. The data packet may be transmitted by the computing device over the network connection. Network information may be determined from a response to the transmitted packet.

An embodiment may include a system for monitoring a business transaction. The system may include a processor, a memory and one or more modules stored in memory and executable by the processor. When executed, the one or more modules may modify a portion of a previously sent data packet for an established network connection, the modification affecting the life of the packet and made by an agent executing on a computing device which sends the packet, transmit the data packet by the computing device over the network connection, and determine network information from a response to the transmitted packet.

DETAILED DESCRIPTION

A TCP packet transmitted as part of an established TCP connection is intercepted, cached and later resent with a modified IP layer to determine network nodes within a network path associated with the established connection. No new connection is required, and the data may be transmitted to its intended location as part of the existing connection, bypassing firewalls and other obstacles commonly affecting ping commands. Address location and response time may be determined for each node in a network path. The change to the IP layer may include a modified TTL value. The TTL value can be adjusted to identify different addresses along the path and multiple copies of the packet may be sent with each TTL value to determine metrics such as response time.

Figure 1:
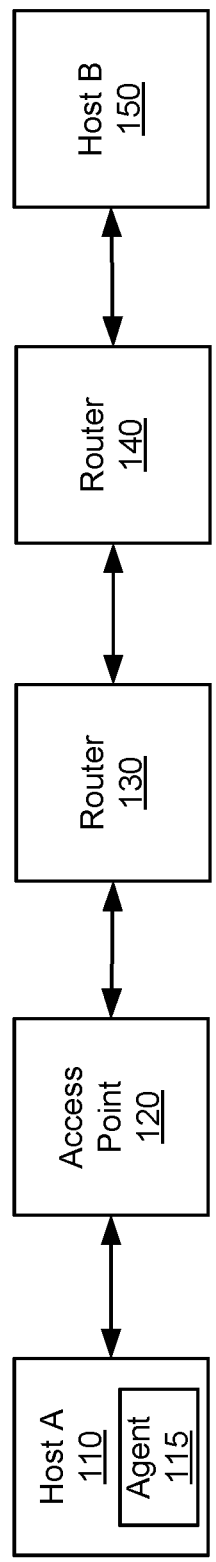
FIG. 1 is a block diagram of an exemplary network path.

FIG. 1 is a block diagram of an exemplary network path. The block diagram of FIG. 1 includes Host A 110, access point 120, router 130 and router 140, and Host B 150. The present technology may send data packets across the network to determine topology and performance of the network path. Devices 110-150 form a network path over which a connection may be made to communicate information between Host A and Host B. In particular, an application on Host A may establish a TCP or other connection with an application or other module on Host B 150. In some embodiments, the network path may include additional access points or routers, or other devices, as part of the network path between Host A and Host B.

Host A may include agent 115. Agent 115 may include one or more software modules which analyze and monitor network topology of the network path between devices 110 and 150. Access point 120 may include a repeater, router, or other device for communicating a wireless signal with Host A 110, router 130 and optionally other devices. Routers 130 and 140 may perform typical router functionality and may communicate data between each other, for example over a network such as the Internet, as part of the network path.

Host B 150 may provide an end point for requests received from Host A. During an established TCP connection, packets sent from Host A may be received by Host B. Host B may send a confirmation message to Host A upon receipt of one or more packets.

Figure 2:
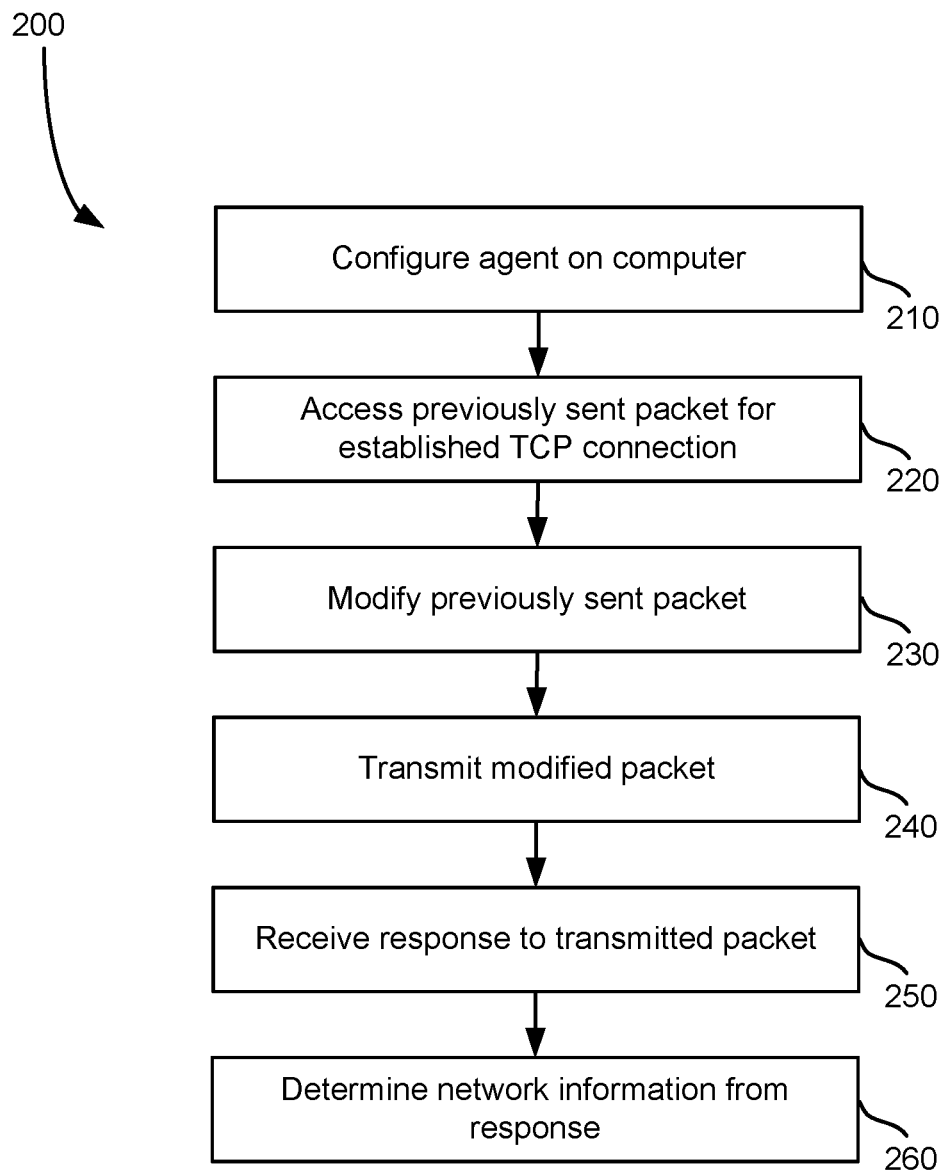
FIG. 2 is a method for analyzing a network path.

FIG. 2 illustrates a method for analyzing a network path. First, an agent may be configured on a computer at step 210. In some embodiments, agent 115 may be configured on a computer which implements Host A 110 of the system of FIG. 1. Configuring the agent may include installing the agent and initializing the agent. The agent may be installed by downloading the agent to the particular computing device, manually loading the agent to the host computer, or other installation method. Configuring the agent may include setting agent monitoring parameters, registering the agent with a controller or other application or hardware, and other initialization tasks for the agent.

A previously sent packet for an established TCP connection is accessed at step 220. Once a TCP connection is established, a packet transmitted as part of the connection may be intercepted and stored by the agent. The stored packet may be cached and later accessed to help determine network path topology and performance. Because the intercepted packet is part of an already established connection, the packet may pass through firewalls and other security mechanisms within the network path. In some embodiments, a protocol such as TCP transport layer protocol may allow duplicate packets to be sent as part of an established connection, preventing rejections or error messages upon receiving a duplicate packet. More information for accessing a previously sent packet is discussed with respect to FIG. 3.

The previously sent packet is modified at step 230. In some embodiments, the modification may include specifying a use or lifetime of the packet as it navigates the network path. The use or lifetime may indicate how far the packet may be sent before the packet expires or can no longer be forwarded any further. In some embodiments, modifying the previously sent packet includes setting a TTL value in the IP layer of the packet.

The modified packet may be transmitted at step 240. In some embodiments, multiple copies of the modified packet are transmitted in order to obtain more data from which to determine the performance of the network path and nodes therein. More information for modifying and transmitting a packet is described with respect to FIG. 4.

A response to the transmitted packet may be received at step 250. The response may be an error message, a receipt or acknowledgment, or some other message. If the transmitted packet has traveled the maximum number of hops as defined by a TTL or other life value without reaching its destination, then the response may include an error message indicating that the packet cannot be transmitted any further. An example of this message is a time expired message. If the packet has reached its final destination, the response may be an acknowledgment message sent from the recipient machine, such as Host B 150 in the system of FIG. 1. In any case, the response may include address information for the last node in the network path reached by the packet.

Network information may be determined from the response received at step 260. The system may determine an identification and timing data for each node in the network path. In some instances, this is determined by transmitting more than one packet with a variety of TTL values. Determining network information is discussed in more detail with respect to FIG. 5.

Figure 3:
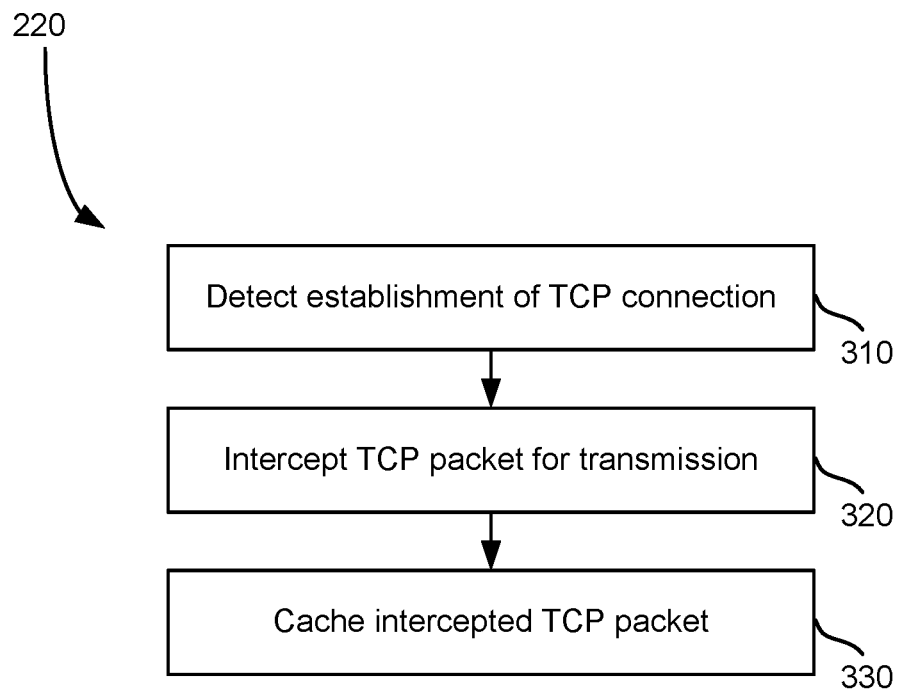
FIG. 3 is a method for accessing TCP data packets.

FIG. 3 is a method for accessing TCP data packets. The method of FIG. 3 provides more detail for step 220 of the method of FIG. 2. First, the establishment of a TCP connection is detected at step 310. The connection may not be initiated by the agent which sends the TCP packet for analysis of the network path. Rather, the TCP connection may be initiated by an application on a Host A which transmits data to Host B. In this case, an agent may resend a previously transmitted packet as part of the TCP connection created by another application.

Once a TCP connection is detected, a TCP packet for transmission within the connection is intercepted at step 320. The TCP packet is originally transmitted by the application on the host as part of the established TCP connection. The packet may be intercepted by the agent before it physically leaves Host A. The intercepted TCP packet may be cached by the agent at step 330. The cached TCP packet is stored until it is to be resent over the network path.

Figure 4:
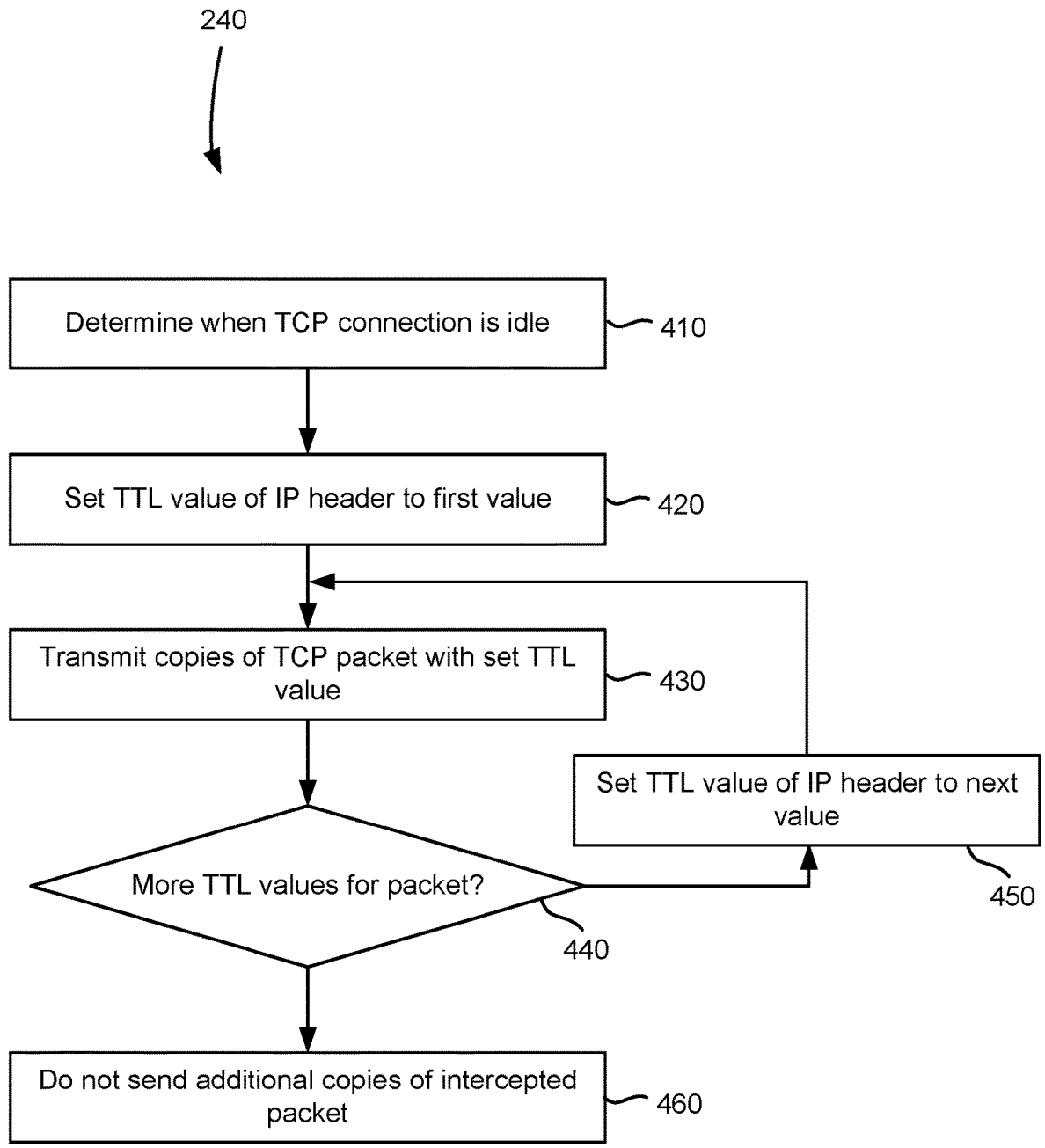
FIG. 4 is a method for transmitting modified packets.

FIG. 4 is a method for transmitting modified packets. The method of FIG. 4 provides more information for step 240 of the method of FIG. 2. First, a determination is made as to when the established TCP connection is idle at step 410. To analyze a network path, an intercepted TCP packet may be transmitted through the TCP connection when the TCP connection is idle, is experiencing low traffic, or some other time that may minimize load on Host A resources or network load. Once a time is identified at which to send the TCP packet, the TTL value in the IP header of the packet is set to a first value at step 420. The first value may be low or high, such as 0 or 255, respectively, and may be incremented or decremented, respectively, upon each successive group of packets sent. The TTL value will indicate the number of hops the particular packet can make across the network path before it cannot be transmitted any further. For example, if a TTL value is set to a value of 2, then the particular packet may travel across two routers or other access points before the packet cannot be sent any further.

Once a TTL value in the IP header is set, copies of the TCP packet with the set TTL value are transmitted at step 430. The system may send a cached packet with the set TTL value more than once, for example ten times. The multiple transmissions of the modified TCP packet will enable several data points from which to ascertain the performance of the particular node. After transmitting the copies of the TCP packet with the particular TTL value, a determination is made as to whether more TTL values for the packet exist at step 440. The maximum TTL value may be 256 or until receipt of a confirmation is received from a desired destination, while the minimum value is zero. If more TTL values for the packet exist to be tried, the TTL value for the IP header may be set to the next value at step 450 and the method of FIG. 4 returns to step 430. If no further TTL values exist, no additional copies of the intercepted packet are transmitted at step 460 and the method of FIG. 4 ends.

Figure 5:
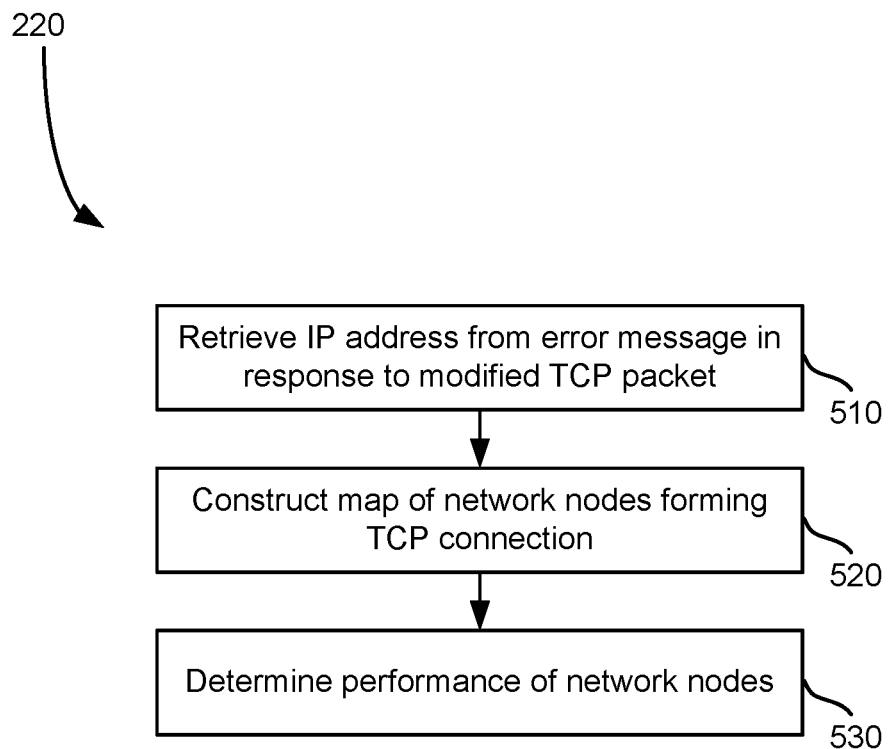
FIG. 5 is a method for determining network information from a response.

FIG. 5 is a method for determining network information from a response. The method of FIG. 5 provides more detail for step 260 of the method of FIG. 2. First, an IP address is retrieved from an error message in response to the modified TCP packet at step 510. In response to the transmitted packet, a response may be received. If the hop maximum is reached per the TTL value before the packet reaches its intended destination (e.g., Host B), the return message may be a time exceeded message. The time exceeded message may include an IP address as part of the error message. If the hop maximum is not reached and the TCP packet reaches its intended destination, the return message may be a receipt confirmation from the destination host. A receipt confirmation from a host may also include an IP address.

A map is constructed of network nodes forming a TCP connection path at step 520. The present system can pair node addresses to a node associated with number of hops allowed based on a TTL value to construct the network path map. The performance of the network nodes is then determined at step 530. The response time per node may be based on the average time for the packet to be sent and received from each particular node in the network path.

Figure 6:
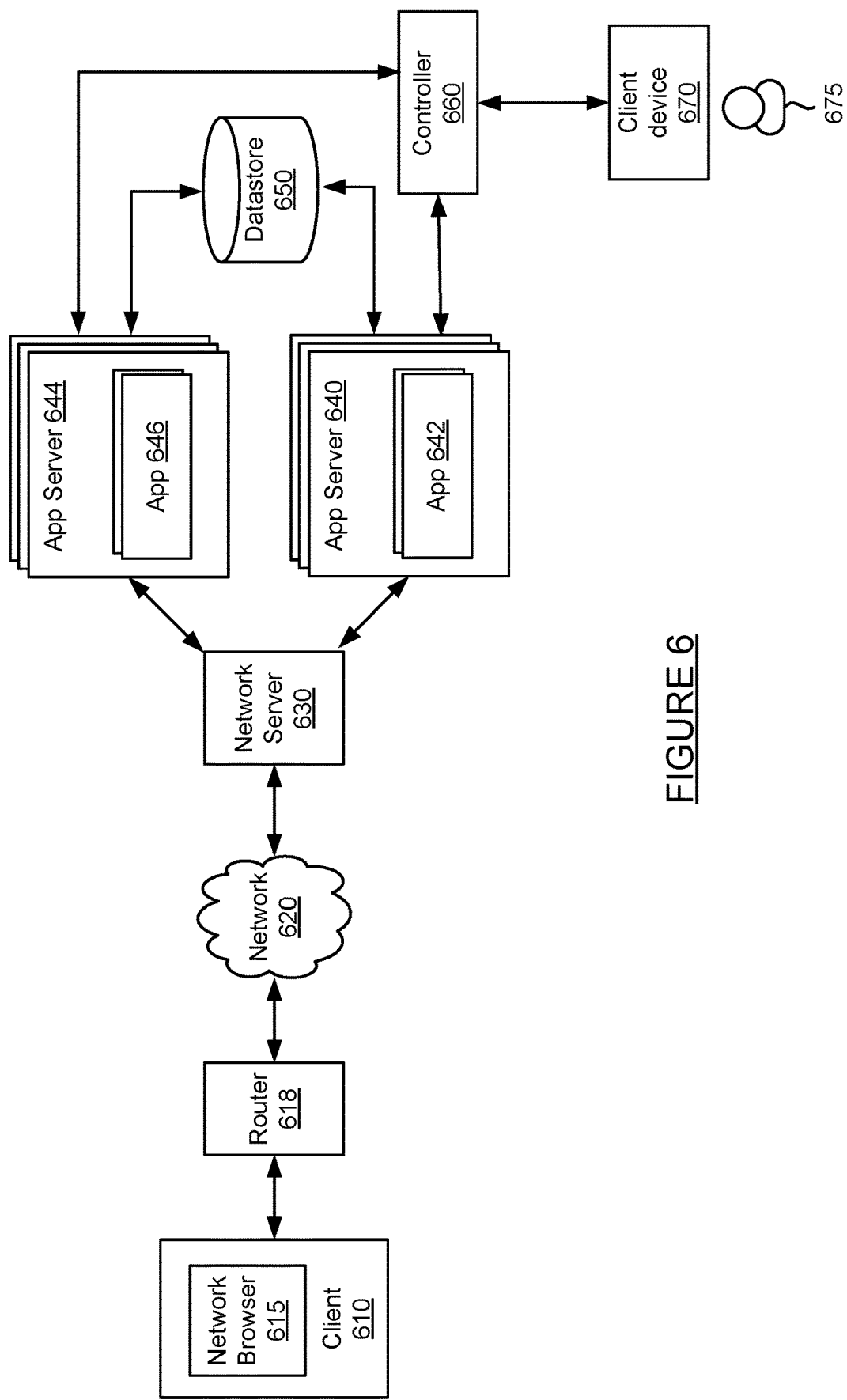
FIG. 6 is a block diagram of a system for processing a distributed business transaction.

The present technology may have several applications. In some embodiments, analysis and monitoring of a network path may be performed in response to detecting an anomaly and doing a deep dive into the system handling a business transaction associated with the anomaly. FIG. 6 is a block diagram of a system for processing a distributed business transaction. The system of FIG. 6 includes client 610, router 618, network 620, network server 630, application servers 640 and 644, a data store 650, controller 660 and a client device 670. The system of FIG. 6 may provide a distributed business transaction by network server 630, application servers 644 and 640, and data store 650. If an anomaly is detected while monitoring a business transaction carried out by devices 630-650, the present system may engage in a deep dive to monitor the details of that business transaction. As part of the deep dive, the present technology may analyze the network path associated with that business transaction. For example, the business path may include communication between client 610, router 618, and network 620. An example of a business transaction monitoring system which may examine a deep dive of a system is disclosed in U.S. patent application Ser. No. 13/189,360, titled "Automatic Capture of Diagnostic Data Based on Transaction Behavior Learning", filed on Jul. 22, 2011, the disclosure of which is incorporated herein by reference.

Figure 7:
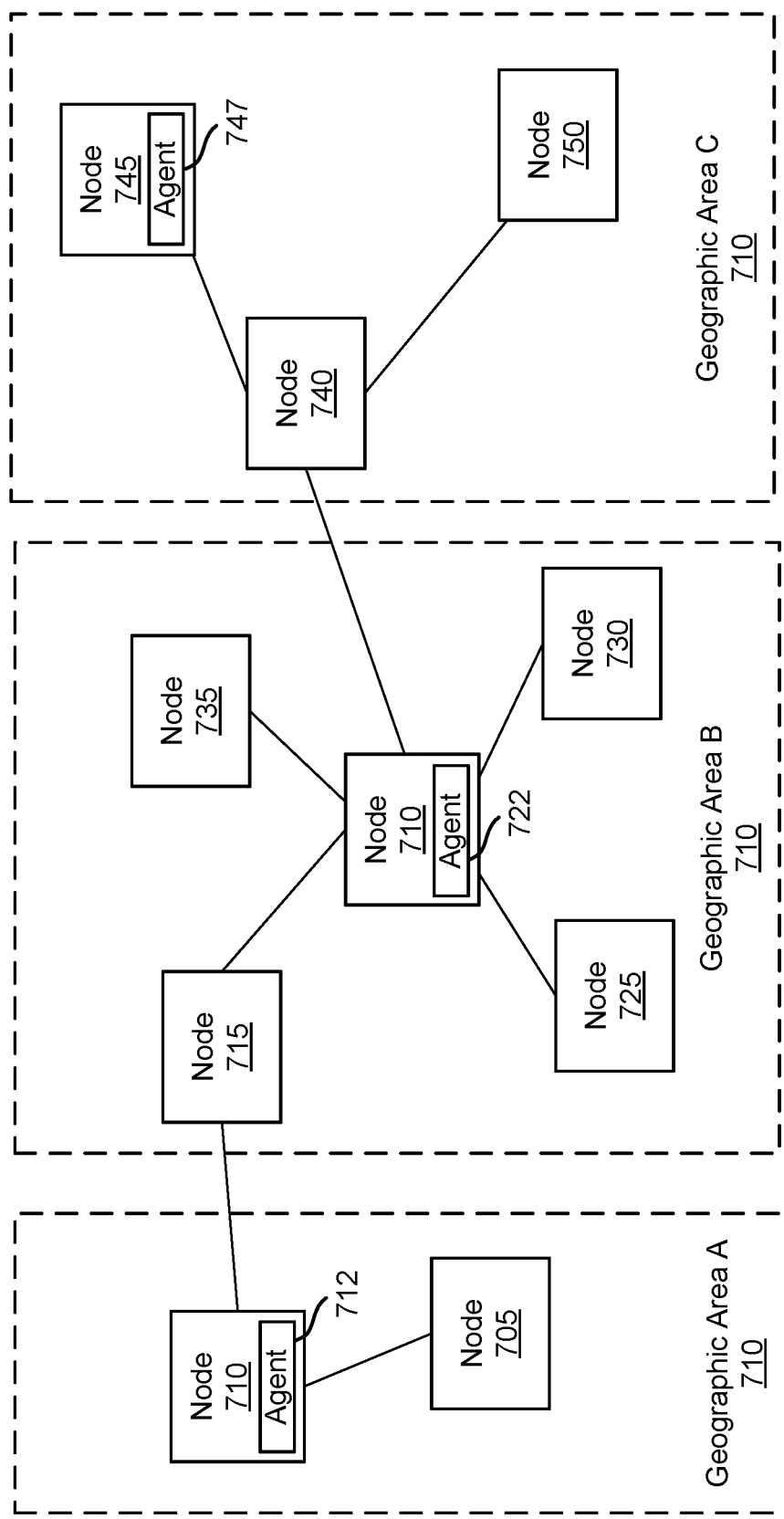
FIG. 7 is a block diagram of nodes in different geographical locations.

Another application of the present technology may include network synthetic monitoring. FIG. 7 is a block diagram of nodes in different geographical locations. In particular, geographic area A may include nodes 710 and 705, geographic area B may include nodes 715, 720, 725, 730, and 735, and geographic area C may include nodes 740, 745 and 750. Agents may be installed in one or more of the nodes which spread over the multiple geographic areas, such as agents 712, 722 and 747 on nodes 710, 720 and 745, respectively. Each agent may monitor the network path within the particular geographical area in order to determine the topography of those network paths and the performance of the network path in a particular geographical area. In this manner, differences in network communications in different geographical areas may be determined and analyzed.

Figure 8:
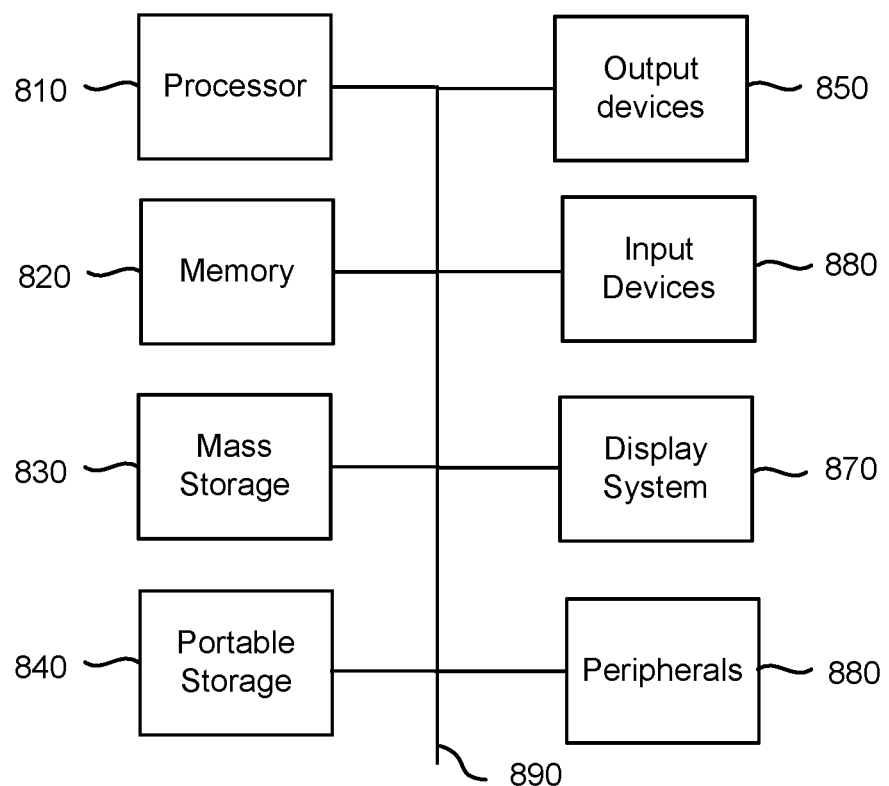
FIG. 8 is a computing system for use with the present technology.

FIG. 8 is a block diagram of a computer system for implementing the present technology. System 800 of FIG. 8 may be implemented in the contexts of the likes of hosts 110 and 150, access point 120, routers 130 and 140, client 610, router 618, network server 630, application servers 640 and 644, data store 650, controller 660, client device 670, and nodes 705-750. Devices such as mobile devices and routers, which capable of conducting wireless communications, may include additional components such as an antenna, additional microphones, and other components typically found in a router or mobile devices such as a smart phone or tablet computer The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 800 of FIG. 8 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for analyzing a network, comprising:
   intercepting, by an agent device in a computer network, a data packet transmitted as part of an established network connection between a host and an application associated with a distributed business transaction;
   caching, by the agent device, a copy of the intercepted data packet;
   transmitting the intercepted data packet over the established network connection;
   modifying, by the agent device, the cached data packet to include a value that indicates how far the modified data packet can be sent before the modified data packet can no longer be forwarded any further;

determining that the established network connection is idle;

in response to determining that the established network connection is idle, transmitting, by the agent device, the modified data packet by the agent device again over the established network connection;

receiving, at the agent device, a response to the modified data packet;

determining, by the agent device, network information based on the response to the modified data packet, wherein the network information includes identification and timing data for each node in a network path associated with the intercepted data packet; and constructing a map of network nodes based on the network information.

2. The method of claim 1, wherein the intercepted data packet is a TCP packet and the established network connection is a TCP connection formed by the network nodes in the constructed map.

3. The method of claim 2, wherein the modified data packet is transmitted at a subsequent time to the intercepted TCP packet.

4. The method of claim 1, wherein a TTL value is added to a header of the cached data packet.

5. The method of claim 1, the response including an address of a last node in the network nodes to receive the modified data packet.

6. The method of claim 1, further comprising: determining a time multiple copies of the modified data packet are sent; and determining a time the response was received.

7. The method of claim 6, further comprising: determining an average difference in time between the multiple copies of the modified data packet were sent and the time the response was received.

8. The method of claim 1, wherein the response includes an error message.

9. The method of claim 1, wherein multiple copies of the modified data packet are subsequently transmitted over the established network connection.

10. The method of claim 1, further comprising: determining an address of each node in network path based on the response.

11. The method of claim 1, further comprising: detecting, by the agent, an anomaly in a performance of a distributed business transaction; and in response to detecting an anomaly, begin to intercept packets received in the established network connection.

12. A non-transitory computer readable storage medium having embodied thereon a program, the program being executable by a processor to perform a method for analyzing a network, the method comprising:

intercepting a data packet transmitted as part of an established network connection between a host and an application associated with a distributed business transaction;

caching a copy of the intercepted data packet; transmitting the intercepted data packet over the established network connection; modifying the cached data packet to include a value that indicates how far the modified data packet can be sent before the modified data packet can no longer be forwarded any further;

determining that the established network connection is idle; in response to determining that the established network connection is idle, transmitting the modified data packet over the established network connection; receiving a response to the modified data packet; determining network information based on the response to the modified data packet, wherein the network information includes identification and timing data for each node in a network path associated with the intercepted data packet;

and constructing a map of network nodes based on the network information.

13. The non-transitory computer readable storage medium of claim 12, wherein the intercepted data packet is a TCP packet and the established network connection is a TCP connection formed by the network nodes in the constructed map.

14. A system for monitoring a business transaction, comprising: a processor; a memory; and one or more modules stored in memory and executable by a processor to intercept a data packet transmitted as part of an established network connection between a host and an application associated with a distributed business transaction, cache a copy of the intercepted data packet, transmit the intercepted data packet over the established network connection, modify the cached data packet to include a value that indicates how far the modified data packet can be sent before the modified data packet can no longer be forwarded any further, determine that the established network connection is idle, in response to determining that that established network connection is idle, transmit the modified data packet over the established network connection, receive a response to the modified data packet, determine network information based on the response to the modified data packet, wherein the network information includes identification and timing data for each node in a network path associated with the intercepted data packet, and construct a map of network nodes based on the network information.

15. The system of claim 14, wherein the intercepted data packet is a TCP packet and the established network connection is a TCP connection formed by the network nodes in the constructed map.

16. The system of claim 15, wherein the one or more modules stored in memory is executable by a processor to perform operations including: determine a time multiple copies of the modified data packet are sent; and determine a time the response was received.

17. The system of claim 16, wherein the one or more modules stored in memory is executable by a processor to perform operations including: determine an average difference in time between the multiple copies of the modified data packet being sent and the time the response was received.

18. The system of claim 14, wherein the one or more modules stored in memory is executable by a processor to determine an address of a node in the network connection from the response.

19. The system of claim 14, wherein the one or more modules stored in memory is executable by a processor to perform operations including: monitor a distributed business transaction; detect an anomaly in the performance of the distributed business transaction; and in response to detecting an anomaly, begin intercepting the data packets in the established network connection.

* * * * *